United States Patent Office 3,457,771
Patented July 29, 1969

---

3,457,771
AUTOMATIC FREEZING POINT INDICATOR AND METHOD
Vincent C. Davis, Richmond, Calif., assignor to Chevron Research Company, San Francisco, Calif., a corporation of Delaware
Filed Dec. 10, 1964, Ser. No. 417,414
Int. Cl. G01h 25/02
U.S. Cl. 73—17                      16 Claims

ABSTRACT OF THE DISCLOSURE

An apparatus for determining and recording the true freezing point of a liquid having a supercooling temperature versus time characteristic. Entry of a sample of the liquid into a measuring cell, cooling of the sample within the cell, recording the temperature of the sample and heating of the frozen sample to facilitate removal from the cell, are automatically started and terminated in correct time sequence by means of a process controller operatively connected to the cell and associated piping. After the sample enters the cell, the temperature of the sample is caused to decrease below true freezing point. Then as the temperature of the sample increases due to the liberation of latent heat of crystallization within the sample, the recorder is actuated to provide a time based plot of the temperature of the sample. Thereafter, the recorder is deactivated, and the cell is heated to remove the sample and allow entry of new sample into the cell.

---

This invention relates to methods and apparatus for automatically determining and recording the freezing temperature of liquids. It relates particularly to the measurement and recording of the freezing point of liquids of refinery processes in which the freezing point is an index of product purity.

Heretofore engineers have determined the freezing point of liquids of refinery processes by methods and apparatus analogous to those described in ASTM-D 1015–55 (Standard Method of Test for Freezing Points of High Purity Hydrocarbons). Although these methods have been automated and have provided satisfactory results, wide application and acceptance have been hindered by environmental limitations related to:

(1) Equalizing the temperature gradient across the tested liquid to avoid undercooling (necessitating the use of mechanical stirrers and scrapers to agitate the liquid), and (2) Initiating crystallization of the liquid after the freezing point has been reached (requiring special seeding procedures).

Recently attempts have been made to simplify on-stream measurement of the freezing point of liquids. An example of such efforts is described in Patent No. 3,060,-318 Method and Apparatus for the Testing of Fluids—P. Ouvrard issued Oct. 23, 1962 in which a cooling gas is automatically introduced into a liquid sample. The gas cools and agitates the sample, and initiates its crystallization. The gas must be removed before the freezing point of the sample is measured. Introducing a foreign cooling gas into the sample however may in some cases lead to interactions incompatible with accurate detection of freezing points so that suitable applications for the method may be correspondingly limited.

Accordingly, it is an object of the present invention to provide a novel procedure and apparatus for accurately and automatically determining and recording the freezing point of liquids in a simple low-cost manner and without mechanical agitation or injection of foreign substances within the sample. It is an additional object of the invention to provide a remotely-controllable procedure and apparatus for quickly and accurately determining the freezing point of liquids in which all procedural steps are automatically initiated by recording control circuitry exterior of the sample in a predetermined sequence based on the temperature changes of the sample.

Briefly this invention determines the freezing point of process liquids in a novel procedure and apparatus and is based on the discovery that liquids having relatively small undercooling temperature intervals, i.e., the temperature interval over which the sample remains in a liquid state although cooled below true freezing point, liberate sufficient heat of fusion or crystallization to allow that portion of the sample adjacent to a temperature detector to return to its true freezing point irrespective of the condition of other portions of the sample remote from the measured portion. In one aspect of the invention this discovery is utilized to provide a novel procedure and apparatus that dispenses with the mechanical stirrers, scrapers or seeding procedures of the prior art yet provides accurate and automatic measurement of the freezing point of process liquids. In another aspect of the invention, the discovery is utilized in a novel procedure and apparatus for determining the freezing point of liquids in which automatic operation of the procedure involves a programmed sequence based upon relative temperature changes of the liquids.

Other features of the invention will become more apparent to those more skilled in the art from the following description of a preferred embodiment of the invention in which.

Liquids measured by the method and apparatus of the invention must have desirable molecular characteristics compatible with the freezing point-purity determination methods. Illustrative examples of compatible liquids include selected organic and inorganic liquid compounds characterized by relatively small absolute undercooling intervals of at least ½° but not greater than 30° and preferably not less than 2° beyond true freezing point. Within the above classification are aromatic liquid hydrocarbons and derivatives thereof including phthalic anhydride, phenol, benzoic acid, paraxylene and metaxylene. measurements of freezing points of compatible liquids in accordance with the invention become less sensitive to phase changes beyond the upper limit of operation because of the nonlinear relationship between the energy level of the undercooling interval and the heat of crystallization or fusion of the sample liquid.

Figure 1:
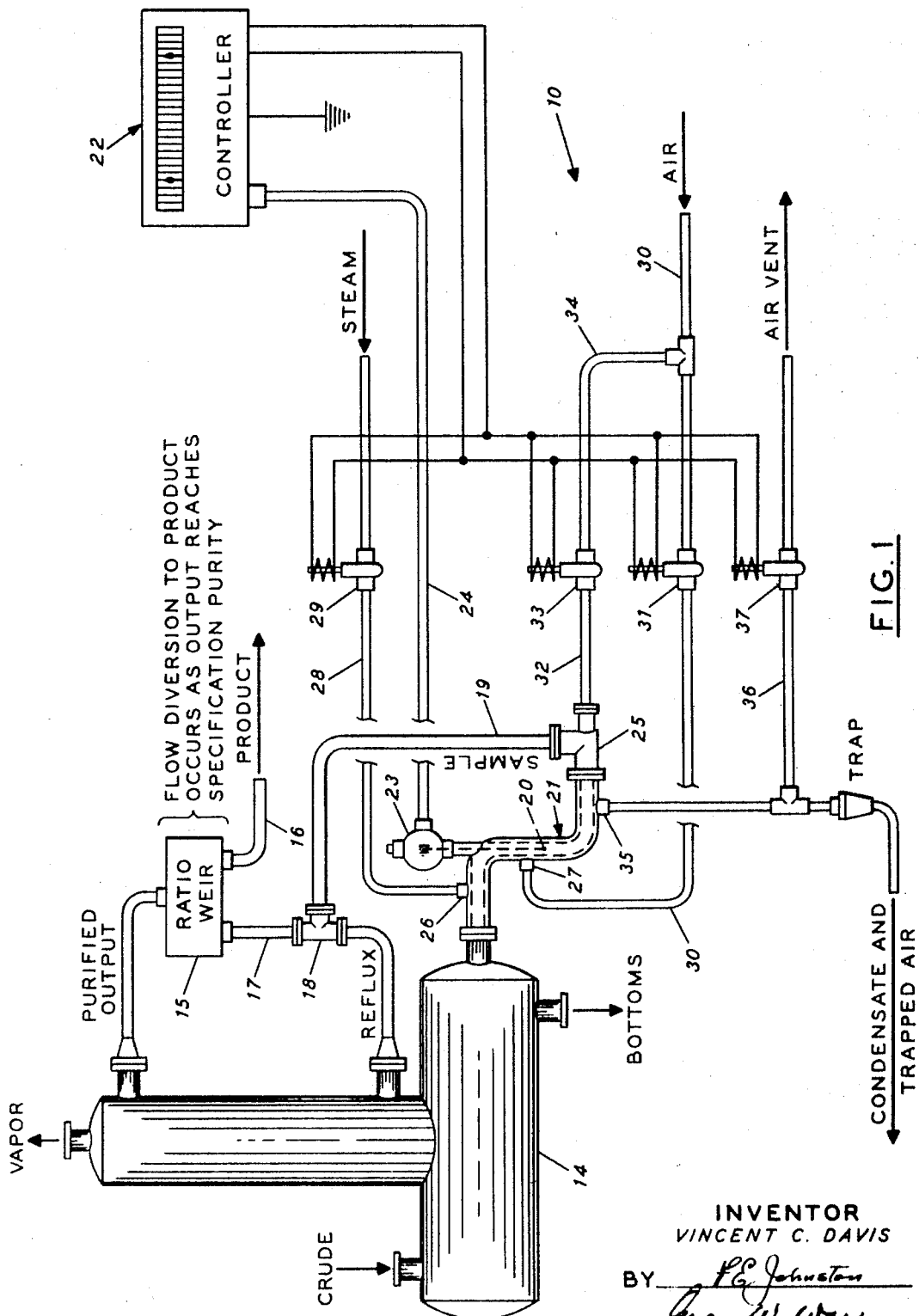
FIGURE 1 is a flow diagram, partially schematic, of a process for purifying liquids in which a portion of recycled output from a distillation vessel is sampled by the freezing indicator in accordance with the invention.

Reference should now be made to the embodiment of FIGURE 1 where the operation of the freezing point indicator 10 is illustrated with reference to a purification process in the manufacture of phthalic anhydride. Purification processes are well understood in the art and are known to include the use of batch distillatiton unit 14 through the processed material, such as the crude phthalic anhydride, is processed. A ratio weir 15 connected at the outlet of unit 14 recycles the distilled phthalic anhydride until specification purity is reached at which time the weir 15 is adjusted to increase flow in product conduit 16 and decrease the flow in reflux conduit 17. The present invention is employed to determine the attainment of the specification purity of the processed material by determining the freezing point of the processed material.

The freezing point indicator 10 of the present invention is positioned between the outlet of ratio weir 15 and the recycle inlet of unit 14, and basically comprises a low heat capacity thermister 20, an insulated sample cell 21 and a controller 22. The thermister 20 is supported mechanically within the cell 21 and is electrically connected to controller 22 by suitable leads passing through support housing 23 and conduit 24. The sample cell 21 mechanically connects to conduit 17 through three-way valve 18, conduit 19 and two-way valve 25. It also includes coupling ports 26 and 27 to sequentially admit:

(1) Steam via conduit 28 and valve 29, and
(2) Cooling air via conduit 30 and valve 31.

The sample enters the cell through valve 25 having a gate stem 32 operatively connected by fluid pressure to control valve 33 of conduit 34. The cooling air exits from the cell by way of coupling vent 35 and conduit 36 controlled by valve 37. The controller 22 provides programmed timing signals to sequentially operate the valves 29, 31, 33 and 37. The timing signals provide automatic control of the flow and the temperature of the sample and in addition provide for the permanent recordation of the measurements of the freezing point of the sample.

Having briefly described an application of the invention, the freezing point indicator 10 will now be described in detail.

Figure 2:
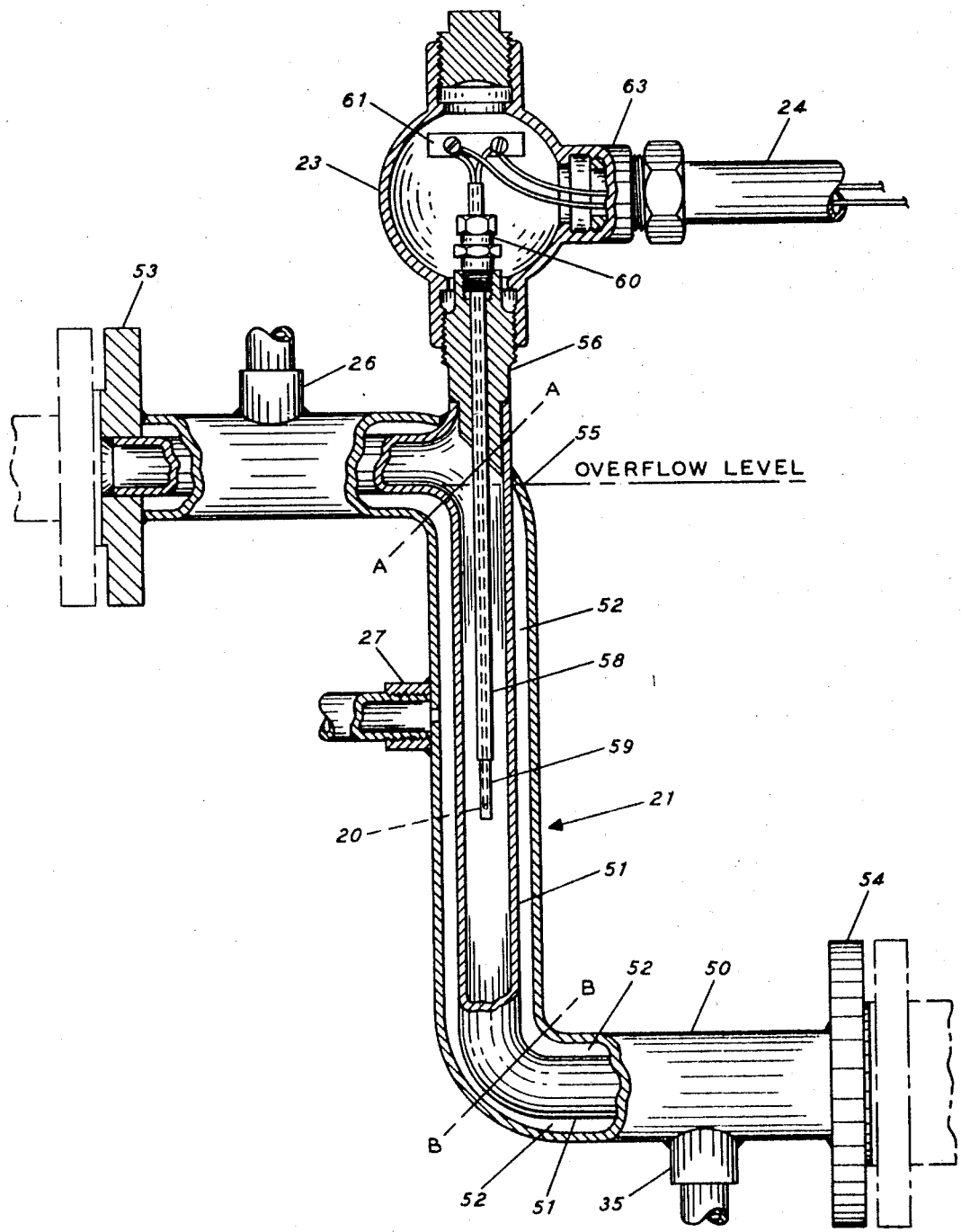
FIGURE 2 is an elevational view, partially cut away, of the sample cell and thermister of the freezing point indicator of FIGURE 1.

Referring now to FIGURE 2, sample cell 21 is constructed of double-walled pipe sections 50 and 51. They are concentrically formed about one another but are spaced apart over the center portion to form an annular space 52. The sample is entrained within pipe section 51 concentric of thermister 20 and is of greatest importance over the interval of pipe defined by lines A—A and B—B. Steam or cooling air circulates in the annular space 52 to regulate the temperature of the sample. As indicated, pipe sections 50 and 51 are joined at their ends by blind flanges 53 and 54. Intermediate these flanges, the sections are unsupported except at elbow 55 where the pipe section 51 extends through pipe section 50 and connects to the hub of support member 56. The coupling port 27 is located approximately at the midpoint of the longitudinal section of the cell adjacent to the thermister 20. Inasmuch as the transverse dimensions of the sample are much smaller than the length dimensions between lines A—A and B—B, cold air entering through port 27 cools the center section of the sample at a higher rate than the sample sections above and below the entry port. Thus a heat reservoir is conveniently provided above and below the center section of the sample adjacent to thermister 20. As undercooling occurs, the reservoir aids in the recovery of the sample to its true freezing point by minimizing the heat loss of the central section. The sample can thus be kept at a freezing point for several minutes after undercooling occurs, aiding accurate recordation of the freezing point of the sample.

The temperature of the sample is determined by the thermister 20 supported in the center portion of the cell. The thermister comprises a temperature sensitive resistor supported within aluminum tube 59. The small size of the thermister and consequent low heat capacity reduces time lag to a minimum, i.e., time lags between a change in temperature and its detection. The aluminum tube 59 attaches to support member 56 through tubular member 58. The tube 59 averages the temperature variations occurring over the sample. This prevents rapid fluctuations of the controller as the sample is cooled. In this embodiment, male connector 60 secures the stainless steel tubular member 58 to support member 56. The leads of the thermister pass through both members 56 and 58 to attach to terminal board 61. The terminal board is insulated from the atmosphere by the housing 23. The wires pass from the housing through outlet 63 and conduit 24 to the controller 22.

Figure 3:
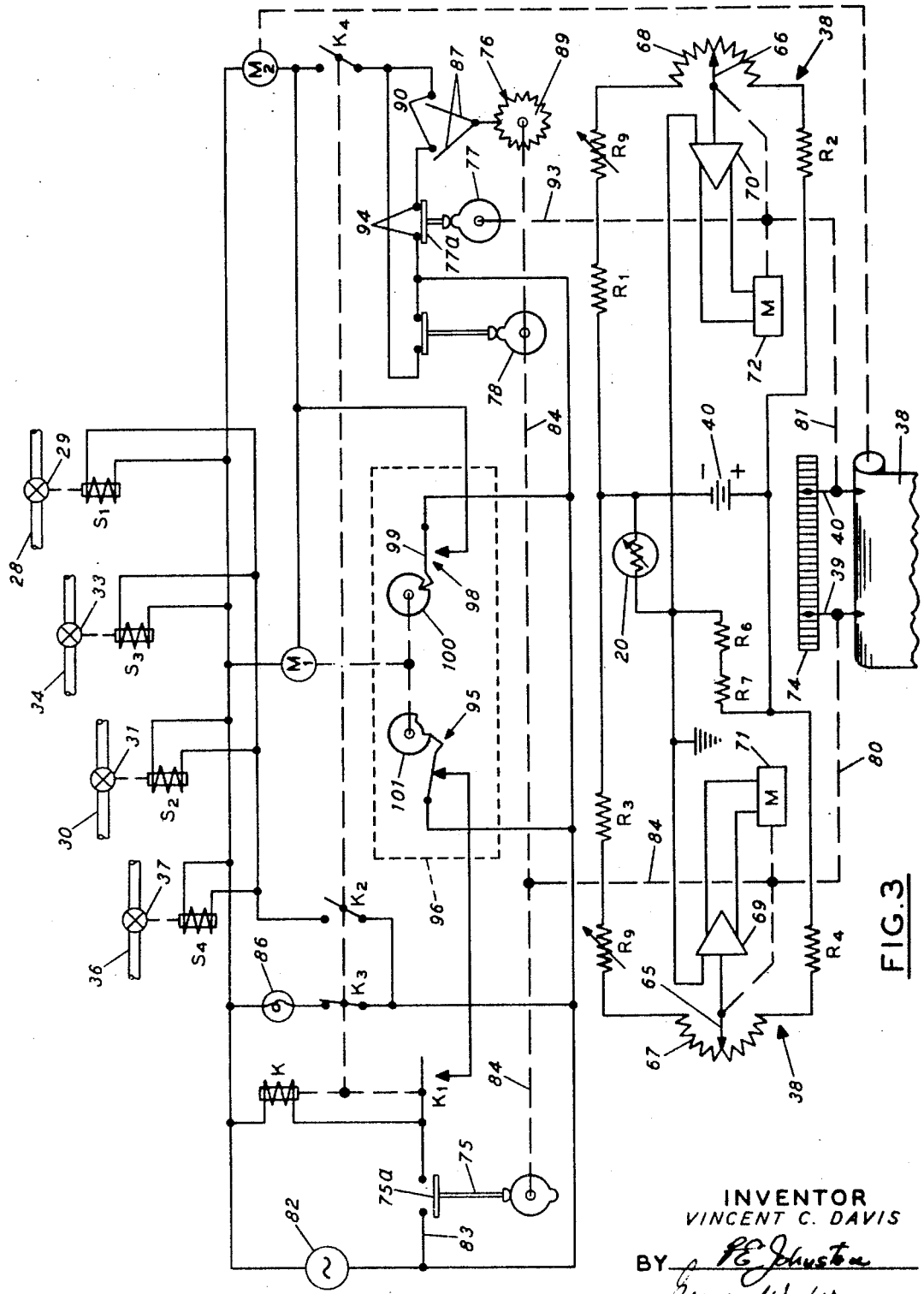
FIGURE 3 is a circuit diagram of the control circuitry of the freezing point indicator.

Referring to FIGURE 3, the controller 22 includes a recorder generally indicated at 38 modified to provide timing signals to operate the valves 29, 31, 33 and 37 as well as to operate chart motor $M_2$. The recorder 38 is a standard two-pen strip chart recorder in which the normal measuring circuits have been replaced by a double-bridge circuit. The thermister 20 forms one arm of the circuit common to both bridges. The operation of the double-bridge circuit is well known in the art, and basically involves the production of unbalanced conditions in one arm of the circuit followed by restoration of a balanced condition of the circuit by changes in the resistivity of other branches of the bridge circuit. In the embodiment of FIGURE 3 the change in the value of thermister 20 is balanced by the adjustment of contacts 65 and 66 relative to slidewires 67 and 68, respectively. To provide the adjustment, the recorder includes a circuit-adjusting means such as phase-sensitive amplifiers 69 and 70 and motors 71 and 72. The motors 71 and 72 have windings that may be selectively operated by the amplifiers to drive the contacts relative to the slidewires to produce zero potential across the amplifiers. These motors, however, are operative only within the temperature sensitivity of the bridge circuit based on the signal response applied to the amplifiers. In the usual case, temperature range is controlled by the selection of the resistors $R_1$, $R_2$, $R_3$, $R_4$, $R_6$ and thermister 20 forming the double-bridge circuit. For the embodiment of FIGURE 3, the resistors $R_1$ and $R_2$ and slidewire 68 are selected so that slide contact 66 responds only to a temperature range of 1°; the resistors $R_3$ and $R_4$ and slidewire 67 are selected so that slide contact 65 responds only to a temperature range of 30°. To provide the above ranges, the following values of $R_1$, $R_2$, $R_3$, $R_4$, $R_6$, slidewires 67 and 68 and thermister 20 are preferred for a temperature centering about 130° C.:

| | Value (ohms) |
|---|---|
| $R_1$ | 1,000 |
| $R_2$ | 1,000 |
| $R_3$ | 250 |
| $R_4$ | 250 |
| Thermister, at center temp. | 15,000 |
| $R_6$ | 15,000 |
| Slidewire 68 | 16 |
| Slidewire 67 | 200 |

In the above preferred embodiment bridge supply 41 operates at 1.68 volts; resistors $R_9$ are rated at 100 ohms and are used to center the temperature intervals. These temperature intervals are usually centered at the expected freezing point of the sample, although in slidewire 67, the center temperature may vary as long as the freezing point of the sample is within the end points of the selected range.

The motors 71 and 72 are not only mechanically connected to the contacts 65 and 66 but also connect to recorder pens 39 and 40 and to recorder switches 75, 76, 77 and 78. As indicated, as the contacts 65 and 66 are moved relative to the slidewires 67 and 68, pens 39 and 40 are adjusted relative to scale 74 and chart 38 through the mechanical linkages designated 80 and 81. Limit switches 75, 77 and 78 and ratchet switch 76 also mechanically connect to the motors. They provide programmed timing signals for operation of solenoids $S_1$, $S_2$, $S_3$ and $S_4$, and chart motor $M_2$.

In the embodiment in accordance with FIGURE 3, the temperature response of the contact 65 and pen 39 are normalized for operation between 110° and 140° C. Likewise the contact 66 and pen 40 are normalized for operation between 130.2° C. and 131.2° C.

Assume the process for purification of crude phthalic anhydride has just begun. A batch charge enters distillation unit 14 and ratio weir 15 at the distilled side is set to reflux all of the charge. As the distilled stream emerges from the weir, a portion is sampled at the valve 18 and passes into the sample cell.

Prior to the entry of the sample, the temperature measured by the themister in the cell is below the operating threshold of the controller. With the controller in a quiescent state, switch 75 is open with respect to conductor 83, and the circuit that includes relay K and power source 82 is inoperative. Switch 75 is a standard limit switch having a cam and cam follower. The follower is mechanically linked to motor 71 through linkage 84. Solenoids $S_1$, $S_2$, $S_3$ and $S_4$ connect to the power source 82 through relay contact $K_2$. But inasmuch as contact $K_2$ is open in the quiescent stage of the controller, they are also in the de-energized state. With the solenoids de-energized, the valves controlled by the solenoids are placed in the following operative states:

(1) Valve 29 is opened with respect to the steam source to circulate steam through the cell to assure that the sample is flowable within the cell, (2) Flow valve 33 is opened with respect to conduit 34 to allow passage of the sample into the cell through valve 25, (3) Cooling air valve 31 is closed with respect to air conduit 30 to prevent premature cooling of the sample, and (4) Vent valve 37 is closed to prevent exiting of the steam from the sample cell as by way of conduit 36.

Relay contact $K_3$ is closed with respect to the power source, allowing panel light 86 to be energized to show that the cell is being heated.

Assume the temperature of the sample is above 140° C., the upper limit of the controller. As the sample flows into the cell, temperature measured by the thermister begins to immediately increase and, at the threshold temperature of the controller initiates operation of the controller. In the initial stage of operations, the operative bridge circuit includes amplifier 69, contact 65, slidewire 67 and pen 39. Adjustments of contact 65 relative to slidewire 67 and pen 39 relative to scale 74 register the initial temperature changes in the cell. As the pen 39 moves upscale relative to indicator 74, its initial movement closes switch 76 in the circuit that includes power source 82, contact $K_4$, chart motor $M_2$ and switch 77a. As indicated, the switch 76 provides contacts 87 pivoted by pinion 89 to close contact points 90. However after the switch 76 closes, a circuit that includes the chart motor $M_2$ and the power source 82 remains disconnected inasmuch as relay contact $K_4$ between the motor and the switch 76, remains open.

When threshold temperature of the second stage of the controller is reached, the pen 40 is actuated by the movement of contact 66 relative to slidewire 68. Adjustment of the contact is by the motor 72 mechanically connected to the pen 40 by the linkage 81. Due to the limit range of the second stage, i.e., of 1° total range, the pen 40 quickly goes full scale relative to the scale 74. Full scale movement actuates switch 77 through linkage 93. Contact 77a disconnects from contact points 94. Thereafter pen 39 also reaches upper scale and actuates the switch 75 through linkage 84 closing the relay K with respect to the power source 82.

With the relay energized, the conditions of the relay contacts reverse, the follows:

(1) Relay contact $K_1$ is closed thereby electrically connecting the relay K to the power source 82 irrespective of the condition of switch 75;

(2) Relay contact $K_2$ is also closed thereby placing solenoids $S_1$–$S_4$ in electrical contact with the power source 82;

(3) Relay contact $K_3$ is open, de-energizing the lamp 86; and (4) Relay contact $K_4$ is closed, but chart motor $M_2$ is not electrically connected to the power source inasmuch as the switch 77 is open with respect to the contact points 94.

As the relay is energized, the operating conditions of the valves controlled by the solenoids $S_1$–$S_4$ also reverse. Both the steam valve 29 and valve 33 controlling the flow of the sample into the cell, close; the cooling air and air vent valves 31 and 37, respectively, are open.

As the cooling air circulates through the cell, the sample begins to cool. Inasmuch as the temperature of the sample is above the upper range of the bridge circuit that includes amplifier 69, motor 71, and pen 39, the controller is in a quiescent state. As the sample cools below the upper range, however, the temperatures of the sample are registered through the adjustment of contact 65 relative to the slidewire 67. As the pen 39 moves downscale relative to indicator 74, the switch 76 is opened by the rotational movement of pinion 89 pivoting contacts 87 away from contact points 90. The switch 75 also opens but the relay K remains energized as current now passes through the relay by way of switch 95 of conventional timer 96. As the sample cools within the upper range of the bridge circuit including amplifier 70, motor 72 and pen 40, pen 40 starts downscale relative to the indicator 74 thereby closing switch 77. As the contacts of switch 77 close it should be observed that no current flows through timing motor $M_1$ inasmuch as switch 76 is now open.

The sample continues to cool. At a temperature not greater than 30° but preferably not less than 2° below the freezing point of the sample, a portion of the sample adjacent to entry of the cooling air crystallizes. As crystallization occurs, latent heat is liberated warming that portion of the sample and increasing the temperature. As the sample is warmed, pen 39 reverses direction causing counterrotation of pinion 89 and the closing of contact points 90. Current now flows to timing motor $M_1$ as well as to chart drive motor $M_2$ to initiate recording of the temperature of the sample. As the timing motor starts, the switch 98 will close, as lever arm 99 is driven from the notch of cam 100, connecting the power source directly to the chart drive motor $M_2$. As the sample warms then cools, switch 76 opens with respect to the contact points 90, but the timing motor will continue to run for one revolution of the cam 100 irrespective of the condition of switch 76 inasmuch as the timing motor is directly coupled to the power source 82 through the switch 98 of the timer. The speed of the timing motor $M_1$ is selected to drive the chart motor $M_2$ for a time period sufficient to record peaks of the temperature after the sample has crystallized. As the timing motor turns, the switch 95 remains closed until its contact finger drops into a notch of cam 101 thereby terminating current flow to the relay K. As the switch 95 opens and the relay is de-energized, the relay contacts $K_1$, $K_2$ and $K_4$ are opened and relay contact $K_3$ closes thereby initiating a new cycle. Thereafter the switch 98 also opens as the lever arm 99 returns to the notch of cam 100, thereby disconnecting the power source 82 from the timing and chart motors. As the new cycle is initiated it should be observed that steam is admitted to the cell and the frozen sample is heated to a liquid state thereby facilitating its removal from the cell as a fresh sample enters.

If the sample fails to undercool or if the purity of the sample is below the range of the recorder, switch 78 will close when pen 39 reaches its low limit. This will cause the timing and chart motors to run their cycles and initiate a new cycle.

Table I summarizes the operation of the controller during a measuring cycle.

TABLE I.—CONTROLLER CIRCUIT

| Condition | Valve 25 | Valve 29 | Valve 31 | Valve 37 | Relay K | Switch 75 | Switch 76 | Switch 77 | Switch 78 | Contact K₁ | Contact K₂ | Contact K₃ | Contact K₄ | Chart Motor M₂ | Timing Motor M₁ | Switch 95 | Switch 98 | Pen 39 | Pen 40 |
|---|---|---|---|---|---|---|---|---|---|---|---|---|---|---|---|---|---|---|---|
| 1. Empty Cell | Open | Open | Closed | Closed | Inactive | Open | Open | Closed | Closed | Open | Open | Closed | Open | Inoper | Inoper | Cl'd | Open | Inoper | Inoper |
| 2. Sample Temp. w/in Sensitivity Range of Pen 39 as Sample is Heated | Open | Open | Closed | Closed | Inactive | Open | Cl'd | Closed | Open | Open | Open | Closed | Open | Inoper | Inoper | Cl'd | Open | Oper | Inoper |
| 3. Sample Temp. w/in Sensitivity of Pen 40 | Open | Open | Closed | Closed | Inactive | Open | Cl'd | Closed | Open | Open | Open | Closed | Open | Inoper | Inoper | Cl'd | Open | Oper | Oper |
| 4. Sample Temp. above Sensitivity of Pens 39 and 40 | Cl'd | Cl'd | Open | Open | Active | Cl'd | Cl'd | Open | Open | Cl'd | Cl'd | Open | Cl'd | Inoper | Inoper | Cl'd | Open | Inoper | Oper |
| 5. Sample Temp. w/in Sensitivity Range of Pens 39 and 40 as Sample Cools | Cl'd | Cl'd | Open | Open | Active | Open | Open | Closed | Open | Cl'd | Cl'd | Open | Cl'd | Inoper | Inoper | Cl'd | Open | Oper | Oper |
| 6. Sample Temp. in Supercooling Range and Heat of Crystal. is Liberated | Cl'd | Cl'd | Open | Open | Active | Cl'd | Cl'd | Closed | Open | Cl'd | Cl'd | Open | Cl'd | Oper | Oper | Cl'd | Open | Oper | Oper |
| 7. Timer 96 in Opn. and Sample Continues to Cool | Cl'd | Cl'd | Open | Open | Active | Open | Open | Closed | Open | Cl'd | Cl'd | Open | Cl'd | Oper | Oper | Open | Open | Oper | Oper |
| 8. After Timer 96 Disconnected | Open | Open | Closed | Closed | Inactive | Open | Open | Closed | Open | Open | Open | Closed | Open | Inoper | Inoper | Cl'd | Open | Oper | Inoper |

I claim:

1. An apparatus for automatically determining and recording the freezing point of a liquid having an undercooling characteristic, comprising a sample vessel for supporting a contained sample of said liquid, means for cooling said sample, a temperature detector immersed in said sample, and controller means connected to said temperature detector, said controller means including recording means for recording the freezing point of said sample, and switching means operatively connected between said recording means and said temperature detector to automatically initiate operation of said recording means at the occurrence of temperature increases in temperature of said sample, said temperature increases being caused by the liberation of latent heat within said sample as crystallization occurs.

2. The apparatus in accordance with claim 1 in which said sample vessel includes a sample coupling means for directing said cooling means into initial contact with said vessel at a location adjacent to said temperature detector.

3. The apparatus in accordance with claim 1 in which said recorder means includes first and second scribe means operatively connected to said temperature detector, chart means in operative contact with said scribe means, and drive means for initiating movement of said chart means relative to said scribe means as the temperature of said sample rises due to liberation of latent heat within said sample.

4. The apparatus in accordance with claim 3 in which said switching means includes a series of switches mechanically linked to said first and second scribe means, at least one of said switches being adapted to be responsive to increases in temperature of said sample due to liberation of latent heat therein so as to initiate operation of said drive means to record the true freezing point of said sample.

5. In an apparatus for automatically determining and recording the freezing point of a liquid comprising a sample vessel, means for supporting and cooling a sample of said liquid over a temperature interval that includes temperatures substantially below the freezing point of said liquid, and a temperature detector immersed in said sample, the improvement comprising controller means connected to said temperature detector and including recorder means for recording the freezing point of said sample, and switching means operatively connected between said recording means and said temperature detector to automatically initiate operation of said recording means as the temperature of said sample rises due to liberation of latent heat within said sample.

6. An apparatus for automatically determining and recording the freezing point of the liquid comprising a sample vessel, supporting a contained sample of said liquid, means for cooling said sample at a substantially constant cooling rate over a temperature interval that includes temperatures substantially below the freezing point of said liquid, a temperature-sensitive resistor immersed in said sample, and controller means connected to said resistor, said controller means including recording means for recording the freezing point of said sample and switching means operatively connected between said recording means and said resistor means to automatically initiate operation of said recording means as the temperature of said sample rises due to liberation of latent heat within said sample, said recorder means including first and second scribe means operatively connected to said resistor, chart means in operative contact with said scribe means, and drive means for initiating movement of said chart means relative to said scribe means, said switching means including a series of switches mechanically linked to said first and second scribe means, at least one of said switches being adapted to initiate operation of said drive means for said chart means as the temperature of said sample rises due to liberation of latent heat within said sample.

7. A method for determining the freezing point of a sample of a liquid having an undercooling characteristic supported within a sample vessel, comprising the steps of:
(a) cooling the sample over a temperature interval including temperatures below the freezing point of said liquid whereby said sample is undercooled with respect to its true freezing point,
(b) monitoring the temperature of said sample,
(c) initiating operation of recording means as the monitored temperature first rises from below the freezing point of said sample due to liberation of latent heat of crystallization to provide a time-temperature record of said sample, and
(d) terminating recording of temperature of said sample after a predetermined time interval.

8. A method for continuously determining the freezing point of a series of samples of a liquid having a supercooling characteristic cyclically supported within a sample vessel, comprising the steps of:
(a) cooling the first of the samples over a temperature interval including temperatures below the freezing point of said liquid whereby said sample becomes supercooled with respect to its true freezing point,
(b) monitoring the temperature of said sample by means of a temperature detector immersed therein,
(c) initiating operation of recording means as the temperature first rises from below the freezing point of said sample due to the liberation of latent heat of crystallization to provide a time-temperature record of said sample,
(d) terminating the recording of temperature and the cooling of said sample after a predetermined time interval, and
(e) heating to facilitate flow of the tested sample from said sample vessel, and passing another sample into said vessel to initiate a new measuring cycle.

9. The method of claim 8 in which the step of cooling the first of the samples over a temperature interval includes cooling the sample to temperatures in a range from about ½° to 30° below true freezing point of the sample.

10. The method of claim 8 in which the step of cooling the first of the samples over a temperature interval includes cooling the sample to temperatures in a range from about ½° to 2° below true freezing point of the sample.

11. Apparatus in accordance with claim 6 with the addition of delay means controlled by and responsive to said switching means at said occurrence of increases in temperature due to liberation of latent heat so as to cause said cooling means and said recording means to be rendered ineffective after recordation of the freezing point of said sample.

12. The apparatus in accordance with claim 11 with the addition of vessel heating means selectively connected to said sample vessel and condition means having discrete first and second operating states adapted to be responsive to said delay means so as to cause said vessel heating means to be effective after said cooling means and said recording means have been rendered ineffective.

13. Apparatus for determining the freezing point of a fusible substance having an undercooling characteristic, comprising a sample chamber initially containing a molten sample of said substance, means for sensing the temperature of the sample in said chamber, controlling means for cooling said chamber, thereby to cool said sample so that its temperature decreases with time, first circuit means including said temperature sensing means having an unbalanced output as the temperature of said sample is within a preselected range of response of said circuit means, second circuit means having an arm including said temperature sensing means adapted to have an unbalanced output as the temperature of said sample is within a preselected range of response of said circuit means, said temperature responsive range of said second circuit means being much less than the responsive range of said first circuit means, mechanical means to restore balance to said first and second circuit means within said preselected ranges of response, means responsive to said mechanical means as said mechanical means restores balance to at least one of said circuit means, said response means including condition means having first and second discrete operating states adapted to change from said first to said second operating state in response to increases in temperature of said sample with time so as to cause recordation of the true freezing point of said sample, said temperature increases being caused by liberation of latent heat within the sample as it crystallizes, said change in operating state of said condition means occurring as the temperature of the sample first increases with time after cessation of decrease of sample temperature within its undercooling interval.

14. Apparatus for determining the freezing point of a fusible substance which has an undercooling characteristic, comprising a sample chamber initially containing a molten sample of the substance, means for sensing the temperature of the sample for said chamber, controllable means for cooling said chamber thereby to cool said sample so that its temperature decreases with time, circuit means including said temperature sensing means adapted to have an unbalanced output in response to changes in the temperature of said sample, mechanical means to restore balance to said circuit means, responsive means controlled by said mechanical means having discrete operating states adapted to change operating state in response to increases in temperature of said sample with time so as to cause recordation of the true freezing point of said sample, said increase in temperature to cause recordation being caused by the liberation of latent heat within the sample as it crystallizes.

15. Apparatus for determining the freezing point of a fusible substance which has an undercooling characteristic, comprising a sample chamber initially containing a molten sample of the substance, means for sensing the temperature of the sample in said chamber, controllable means for cooling said chamber thereby to cool said sample so that its temperature decreases with time, means controlled by said temperature sensing means for producing a control signal, means controlled by said signal, said controlled means including recording means and responsive to said signal as the temperature of the sample increases with time within its undercooling interval to initiate operation of said recording means to permanently record the true freezing point of said sample, said increase in temperature for response of said controlled means being caused by liberation of latent heat within the sample as it crystallizes.

16. Apparatus in accordance with claim 15 for cyclically determining the freezing point of said substance, with the addition of chamber heating means for said chamber, and in which said controlled means also includes a delay means responsive to said signal at the occurrence of an increase in the temperature of the sample within its undercooling interval so as to cause said cooling means and said recording means to be rendered ineffective and to cause the chamber heating means to be rendered effective after recordation of the true freezing point of said sample.

References Cited

UNITED STATES PATENTS

| 2,635,456 | 4/1953 | Barstow | 73—17 |
| 2,885,885 | 5/1959 | Lupfer et al. | 73—17 |

FOREIGN PATENTS 96,982    1961    Netherlands.

OTHER REFERENCES

Abele, John E.: The Physical Background to Freezing Point Osmometry and Its Medical-Biological Application, 1963, pp. 32–41.

JAMES J. GILL, Primary Examiner